United States Patent
Cheng et al.

(10) Patent No.: US 11,918,992 B2
(45) Date of Patent: Mar. 5, 2024

(54) MULTI-REGION SLURRY SHELL-AND-TUBE REACTOR

(71) Applicants: ZHEJIANG WYNCA CHEMICAL INDUSTRY GROUP CO., LTD, Zhejiang (CN); EAST CHINA UNIVERSITY OF SCIENCE AND TECHNOLOGY, Shanghai (CN)

(72) Inventors: Zhenmin Cheng, Shanghai (CN); Shengbao Jiang, Zhejiang (CN); Shenluan Yu, Zhejiang (CN); Shuguang Zhou, Zhejiang (CN); Minhai Tu, Zhejiang (CN); Long Qin, Zhejiang (CN); Zhichao Jin, Shanghai (CN); Zibin Huang, Shanghai (CN); Meichen Chen, Shanghai (CN); Peiqing Yuan, Shanghai (CN)

(73) Assignees: ZHEJIANG WYNCA CHEMICAL INDUSTRY GROUP CO., LTD, Zhejiang (CN); EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days.

(21) Appl. No.: 17/770,645

(22) PCT Filed: Nov. 23, 2020

(86) PCT No.: PCT/CN2020/130761
§ 371 (c)(1),
(2) Date: Apr. 21, 2022

(87) PCT Pub. No.: WO2021/083386
PCT Pub. Date: May 6, 2021

(65) Prior Publication Data
US 2022/0410108 A1     Dec. 29, 2022

(30) Foreign Application Priority Data

Oct. 29, 2019 (CN) ......................... 201911039163.X

(51) Int. Cl.
*B01J 8/22* (2006.01)
*B01J 8/18* (2006.01)

(52) U.S. Cl.
CPC ............. *B01J 8/226* (2013.01); *B01J 8/1872* (2013.01); *B01J 2208/0084* (2013.01)

(58) Field of Classification Search
CPC ... B01J 8/226; B01J 8/1872; B01J 2208/0084
See application file for complete search history.

(56) References Cited

U.S. PATENT DOCUMENTS

| 2007/0202035 A1 | 8/2007 | Walsdorff et al. |
| 2010/0216896 A1 | 8/2010 | Wang et al. |

FOREIGN PATENT DOCUMENTS

| CN | 1200457 A | 12/1998 |
| CN | 101396647 A | 4/2009 |

(Continued)

OTHER PUBLICATIONS

Machine Translation of WO 2007114271 A1 (Year: 2007).*

(Continued)

*Primary Examiner* — Lessanework Seifu
(74) *Attorney, Agent, or Firm* — Yue (Robert) Xu; Apex Attorneys at Law, LLP

(57) ABSTRACT

The present application discloses a multi-region plasma shell-and-tube reactor comprising a shell body. At least two reaction regions are provided inside the shell body, and a horizontal separation panel is provided between any two adjacent reaction regions, used to separate the two and passing through the tubes. A central hole is provided in the center of any horizontal separation panel, and at least one auxiliary hole distributed around the central axis of the (Continued)

central hole is provided in any horizontal separation panel so as to cooperate with the central hole to cause a vortex state to be formed in a reaction region.

9 Claims, 4 Drawing Sheets

(56)     References Cited

FOREIGN PATENT DOCUMENTS

| CN | 101417220 A | 4/2009 |
|----|----|----|
| CN | 102557134 A | 7/2012 |
| CN | 103962069 A | 8/2014 |
| CN | 103998866 A | 8/2014 |
| CN | 106824019 A | 6/2017 |
| CN | 110652943 A | 1/2020 |
| CN | 110694558 A | 1/2020 |
| EP | 2210661 A2 | 7/2010 |
| WO | 2005092488 A1 | 10/2005 |
| WO | WO2007114271 A1 * | 11/2007 |
| WO | 2013095931 A1 | 6/2013 |

OTHER PUBLICATIONS

Machine Translation of CN101417220 A (Year: 2006).*
International Search Report for PCT/CN2020/130761 dated Feb. 23, 2021, ISA/CN.
Qin Ling et al., Effect of Sieve Plates Structure on Hydrodynamic Parameters in Multistage Bubble Column Reactor, Chemical Engineering (China), vol. 38 No. 9, Sep. 2010.

* cited by examiner

MULTI-REGION SLURRY SHELL-AND-TUBE REACTOR

CROSS REFERENCE TO RELATED DISCLOSURES

The present application is a national phase application of PCT international patent application PCT/CN2020/130761, filed on Nov. 23, 2020 which claims priority to Chinese Patent Application 201911039163.X, titled "MULTI-REGION PLASMA SHELL-AND-TUBE REACTOR", filed on Oct. 29, 2019 with the China National Intellectual Property Administration, which is incorporated herein by reference in its entirety.

FIELD

The present disclosure relates to the technical field of chemical equipment, and in particular to a multi-region slurry shell-and-tube reactor.

BACKGROUND

A slurry column reactor, especially a multi-region slurry shell-and-tube reactor, is generally accompanied by strong heat release during chemical reaction, so that the slurry column reactor must be further provided with a heat exchanger. The heat exchanger is generally fixed at two ends of the reactor in a form of tube rows, cooling medium flows in from one end of the heat exchanger and flows upward along a tube side, that is, the cooling medium flows in the tube rows; both gaseous reactant and slurry reactant enter the slurry column reactor from a side of the slurry column reactor and flow upward along a shell side, so that the slurry reactant flows along with the gaseous reactant in the entire slurry column reactor and produce chemical reaction during flowing.

Taking the continuous production of alkyl aluminum chloride as an example, the metal aluminum powder is introduced into a column body filled with liquid solvent from the bottom of the column body, and is bubbled and dispersed by another raw material gaseous monochloroalkane introduced in from another portion of the bottom of the column body, and then the aluminum powder and the monochloroalkane react chemically in the column body to produce alkyl aluminum chloride. Since the aluminum powder is extremely fine, easy to flow with the solvent and thus difficult to be separated, the aluminum powder is required to be completely converted in the reactor. In addition, the heat release by the reaction between the aluminum powder and the monochloroalkane is very exothermic, and the heat must be transferred quickly. However, although a structure of the existing slurry column reactor has a heat transfer function, there is a strong back-mixing in the interior as a whole, so that the aluminum powder cannot appear in step distribution within the reactor and the requirement of outlet material without aluminum powder cannot be met. Therefore, a slurry column reaction with heat function and preventing overall back-mixing flow should be provided

SUMMARY

An object of the present disclosure is to provide a multi-region slurry shell-and-tube reactor, that is, the reactor is separated into multiple reaction regions, so as to prevent the overall back-mixing flow.

The specific solutions are as follows.

A multi-region slurry shell-and-tube reactor provided according to the present disclosure includes a shell, at least two reaction regions are provided inside the shell, a transverse partition plate configured to separate any two adjacent reaction regions and passing through tube rows is provided between the any two adjacent reaction regions, a central hole is provided at the center of any transverse partition plate, an auxiliary hole distributed around a central axis of the central hole is provided in each transverse partition plate to generate a vortex state in the reaction region cooperating with the central hole.

Preferably, an inner diameter of the central hole 121 ranges from $1/5$ to $1/3$ of an inner diameter of the shell.

Preferably, an inner diameter of any auxiliary hole ranges from $1/10$ to $1/8$ of the inner diameter of the shell.

Preferably, a radial distance between the center of any auxiliary hole and the center of the central hole ranges from 0.6 to 0.8 times of the inner diameter of the shell.

Preferably, the number of auxiliary holes provided in any transverse partition plate ranges from 3 to 6.

Preferably, three to six auxiliary holes uniformly arranged in a ring shape are provided in any transverse partition plate.

Preferably, an axial distance between any two adjacent transverse partition plates ranges from 0.5 to 1 times of the inner diameter of the shell.

Preferably, two to four transverse partition plates are provided inside the shell in a case that a height of the shell is lower than 5 meters; at least 4 transverse partition plates are provided inside the shell in a case that the height of the shell is greater than 5 meters.

Preferably, the reaction region includes a first reaction region located at a bottom end of the shell, a gaseous reactant inlet and a liquid reactant inlet are provided on a side of the first reaction region, and the liquid reactant inlet is located above $1/2$ of a height of the first reaction region.

Compared with the prior art, the multi-region slurry shell-and-tube reactor provided according to the present disclosure includes the housing, at least two reaction regions are provided inside the shell, the transverse partition plate is provided between any two adjacent reaction regions, and each transverse partition plate is provided with one central hole and at least one auxiliary hole. During the chemical reaction, the gas-liquid mixed reactant in the reaction region ascends through the central hole due to low density, and gaseous reactant in the reaction region descends through the auxiliary hole due to high density, so as to form a rising and falling circulation phenomenon in the reaction region, and block the liquid reactant from circulating along an inner chamber of the shell, so that the liquid in each reaction region comes to a vortex motion state, short circuits and dead angles in the fluid in the shell are avoided, and the overall back-mixing flow is prevented.

BRIEF DESCRIPTION OF THE DRAWINGS

For more clearly illustrating embodiments of the present disclosure or technical solutions in the conventional technology, the drawing referred to describe the embodiments or the conventional technology will be briefly described hereinafter. Apparently, the drawing in the following description is only an example of the present disclosure, and for those skilled in the art, other drawings may be obtained based on the provided drawing without any creative efforts.

Figure 1:
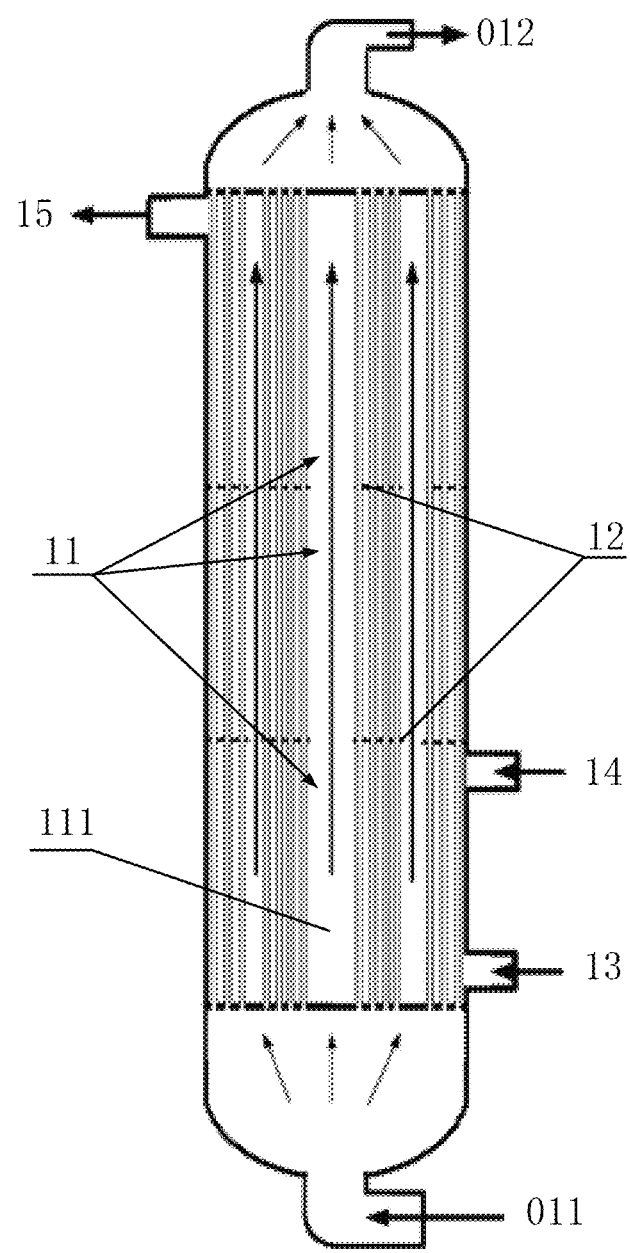
FIG. 1 is a schematic structural view of a multi-region slurry shell-and-tube reactor provided according to a specific embodiment of the present disclosure.

Reference numerals are as follows:

| | |
|---|---|
| 011 cooling medium inlet, | 012 cooling medium outlet; |
| 11 reaction region, | 12 transverse partition plate, |
| 13 gaseous reactant inlet, | 14 liquid reactant inlet, |
| 15 reaction product outlet; | |
| 111 first reaction region; | |
| 121 central hole, | 122 auxiliary hole. |

DETAILED DESCRIPTION OF THE EMBODIMENTS

Hereinafter technical solutions in embodiments of the present application are described clearly and completely in conjunction with the drawings in embodiments of the present application. Apparently, the described embodiments are only a part of the embodiments of the present application, rather than all the embodiments. All other embodiments obtained by those skilled in the art based on the embodiments of the present application without any creative work fall within the protection scope of the present application.

In order to enable those skilled in the art to better understand the solution of the present disclosure, the present disclosure will be further described in detail below with reference to the accompanying drawings and specific embodiments.

Figure 2:
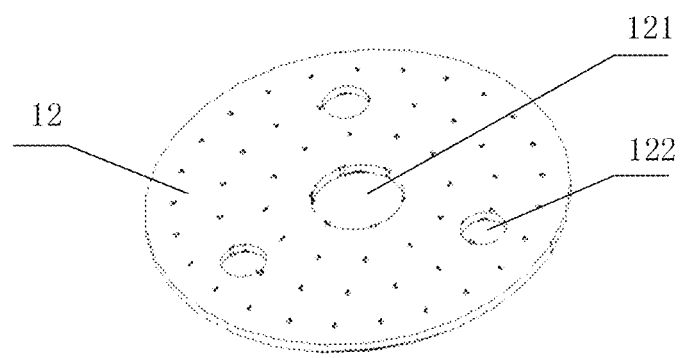
FIG. 2 is a schematic structural view of a transverse partition plate in FIG. 1.

Referring to FIG. 1 and FIG. 2, FIG. 1 is a schematic structural view of a multi-region slurry shell-and-tube reactor provided according to a specific embodiment of the present disclosure; and FIG. 2 is a schematic structural view of a transverse partition plate in FIG. 1.

A multi-region slurry shell-and-tube reactor is provided according to the embodiment of the present disclosure, and its key improvement is in optimizing the structure of internal components, so as to improve the gas-liquid mixing effect.

The multi-region slurry shell-and-tube reactor according to the present disclosure includes a shell. In the specific embodiment, the shell is columnar, a heat exchanger is provided inside the shell, and the heat exchanger is fixed at two ends of the reactor in a form of tube rows, and a bottom end of the heat exchanger is provided with a cooling medium inlet 011 for the cooling medium to flow in, so that the cooling medium can flow upward along a tube side. In addition, the top of the heat exchanger is provided with a cooling medium outlet 012 for the cooling medium to be discharged.

At least two reaction regions 11 are provided inside the shell, a transverse partition plate 12 is provided between any two reaction regions 11 so that the transverse partition plate 12 separates these two reaction regions 11. In addition, multiple through holes for the tube rows to pass through are defined in the transverse partition plate 12. In this specific embodiment, the shell is provided with multiple transverse partition plates 12, and all the transverse partition plates 12 are parallel.

The reaction region 11 includes a first reaction region 111 located at a bottom end of the shell. Considering different composition of the reactants, a gaseous reactant inlet 13 and a liquid reactant inlet 14 are provided on a side of the first reaction region 111, so that both the gaseous reactant and the liquid reactant can flow upward along a shell side. The gaseous reactant inlet 13 is configured to fill the gaseous reactant in, and the gaseous reactant inlet 13 is located at the bottom of the first reaction region 111, so that the entire shell can be in a bubbling fluidization state from the bottom. The liquid reactant inlet 14 is configured to fill the slurry reactant in. In order to improve the mixing effect, the liquid reactant inlet 14 is located above ½ of a height of the first reaction region 111, so that the solid particles carried by the gaseous reactant have a sufficient sedimentation height, which is beneficial for reaching a full fluidization state. In addition, the reaction region 11 located at the top of the shell is provided with a reaction product outlet 15 for discharging the reacted product.

In order to ensure that the shell has a good gas-liquid mixing effect, two to four transverse partition plates 12 are provided inside the shell in a case that a height of the shell is lower than 5 meters; at least 4 transverse partition plates 12 are provided inside the shell in a case that the height of the shell is greater than 5 meters.

Furthermore, an axial distance between any two adjacent transverse partition plates 12 ranges from 0.5 to 1 times of an inner diameter of the shell, which can effectively avoid dead angles in each reaction region 11, and thus the gas-liquid mixing effect is good. Besides, the axial distance between any two adjacent transverse partition plates 12 is not less than 0.3 times of the inner diameter of the shell, and not more than 1.5 times of the inner diameter of the shell.

A central hole 121 is provided at the center of each partition plate 12, at least one auxiliary hole 122 distributed around a central axis of the central hole 121 is provided in each transverse partition plate 12. In the specific embodiment, the central hole 121 is a circular through hole defined at the center of the transverse partition plate 12, and the central axis of the central hole 121 coincides with a central axis of the transverse partition plate 12.

In order to further improve the gas-liquid mixing effect, the number of auxiliary holes 122 provided in any transverse partition plate 12 ranges from 3 to 6. In the specific embodiment, the number of the auxiliary holes 122 provided in any transverse partition plate 12 is specifically three, the three auxiliary holes 122 are all circular through holes, and the three auxiliary holes 122 are uniformly arranged in a ring shape, so that the liquid is formed in a good vortex state, which is beneficial for improving the gas-liquid mixing effect.

Figure 3:
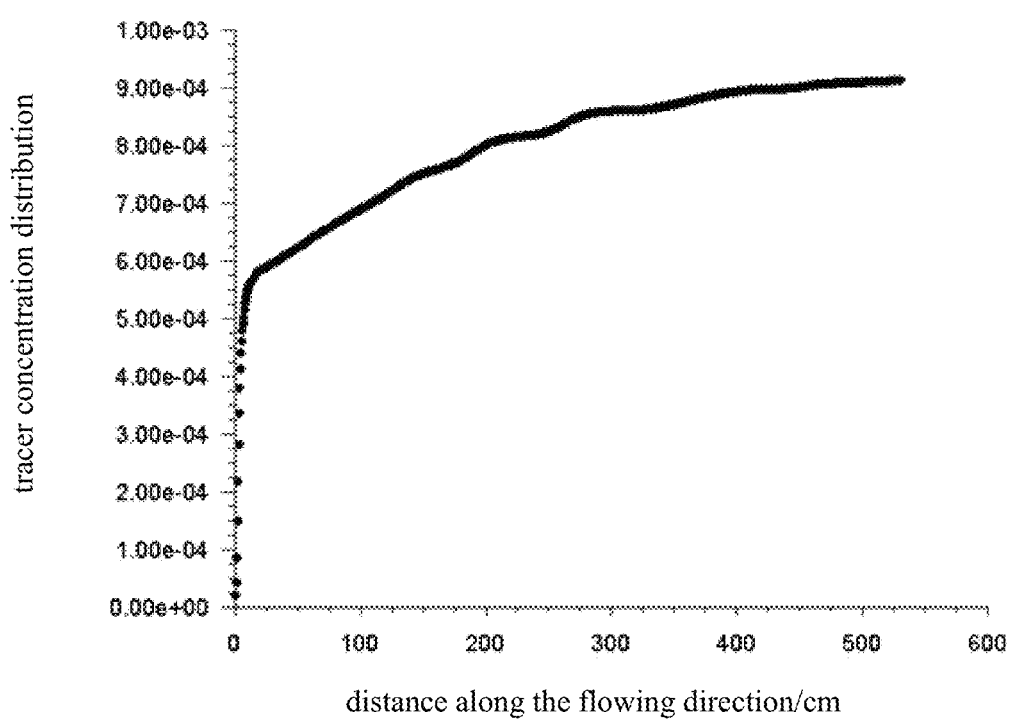
FIG. 3 shows a tracer concentration distribution along a flowing direction in a bubble column without providing partition plates.
Figure 4:
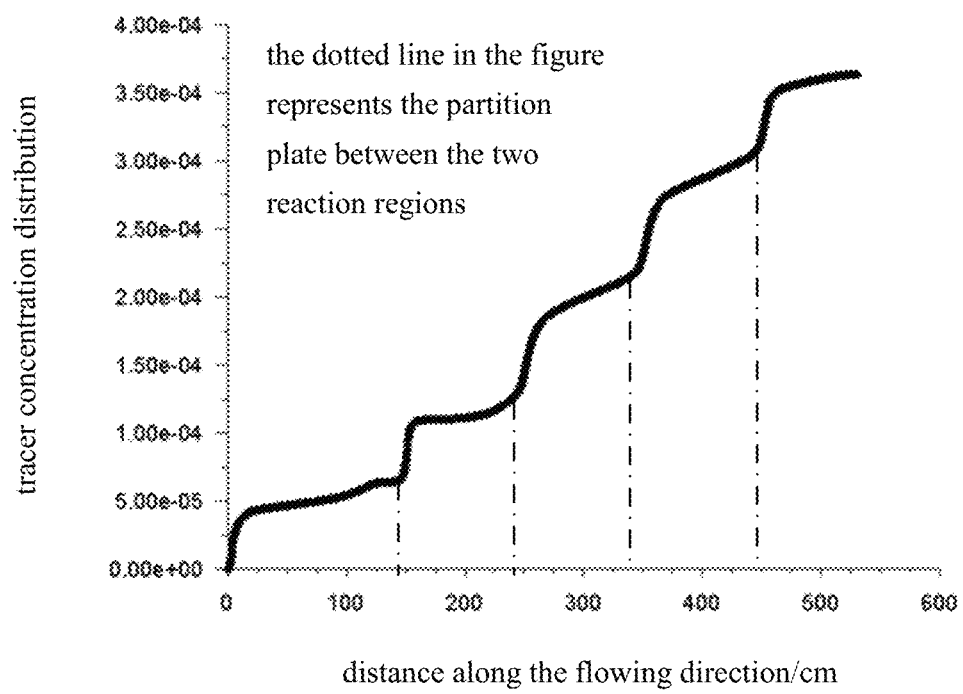
FIG. 4 shows a tracer concentration distribution along a flowing direction in the bubble column with four partition plates.

Referring to FIG. 3 and FIG. 4, FIG. 3 shows a tracer concentration distribution along a flowing direction in a bubble column without providing a partition plate; and FIG. 4 shows a tracer concentration distribution along a flowing direction in the bubble column with four partition plates. In order to illustrate the limiting effect of the partition plate 12 on the back-mixing fluid inside the shell, comparison between FIG. 3 and FIG. 4 is made after a tracer is injected into the bottom of the shell, where FIG. 3 represents the shell without a transverse partition plate 12, and it can be easily seen from FIG. 3 that the tracer fills the entire chamber of the shell; FIG. 4 represents the shell provided with the transverse partition plate 12, and it can be easily seen from FIG. 4 that the tracer has a gradient distribution inside the shell, and the concentration difference between the reaction regions 11 is apparent, so that it can be easily concluded that the transverse partition plate 12 can prevent the back-mixing of the liquid phase.

Figure 5:
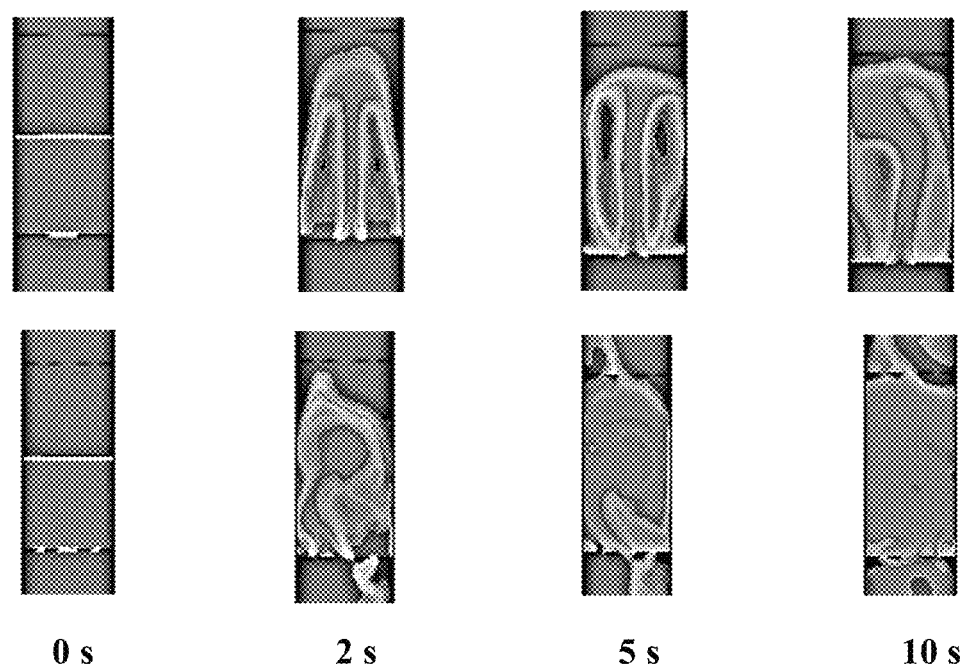
FIG. 5 is a fluid state view corresponding to the transverse partition plate with only a central hole and the transverse partition plate with both a central hole and an auxiliary hole in different time periods, respectively.

Referring to FIG. 5, which is a fluid state view corresponding to the transverse partition plate 12 with only a central hole 121 and the transverse partition plate 12 with both a central hole 121 and an auxiliary hole 122 in different time periods, respectively. The different time periods specifically refer to four time periods of 0 s, 2 s, 5 s and 10 s. The first row represents that reactants are simultaneously injected at 0 s. The second row and the third row represents the states at 2nd second and 5th second respectively, the transverse partition plate 12 with only a central hole 121 only enables the reactants to flow upward into the next reaction region 11 through the central hole 121, some liquid reactants that fail to leave the reaction region 11 turn back and be directed downward after collision with the transverse partition plate 12, there is agglomeration in the reaction region 11 and the gas and liquid are difficult to be fully mixed. However, the transverse partition plate 12 with both the central hole 121 and the auxiliary hole 122 enables the reactants to form a vortex state under the combined action of the central hole 121 and the auxiliary hole 122, and there is almost no static region inside the reaction region 11 and the gas and liquid can be fully mixed. The four row represents that, when it is at 10th second, the reaction region 11 where the transverse partition plate 12 with only the central hole 121 is located is not fully mixed while the reaction region 11 where the transverse partition plate 12 with both the central hole 121 and the auxiliary hole 122 is located can be fully mixed.

The stage number of series fully mixed kettles of which the shell is without the transverse partition plate 12 is 3, and the stage number of series fully mixed kettles of which the shell has four transverse partition plates 12 can reach 6, regardless of whether the transverse partition plate 12 is provided with the auxiliary hole 122 and whether the inner diameters of the central holes 121 are the same. Furthermore, the stage number of series fully mixed kettles of which the shell has nine transverse partition plates 12 can reach 24, which is very closed to the plug flow.

During the chemical reaction, the gas-liquid mixed reactant in the reaction region 11 ascends through the central hole 121 due to low density while the gaseous reactant descends through the auxiliary hole 122 due to high density, so as to form a rising and falling circulation phenomenon in the reaction region 11, and block the liquid reactant from circulating along an inner chamber of the shell, so that the liquid in each reaction region 111 comes to a vortex motion state, short circuits and dead angles in the fluid inside the shell are avoided, and the overall back-mixing flow is prevented.

Preferably, an inner diameter of the central hole 121 ranges from ⅕ to ⅓ of the inner diameter of the shell, which provides sufficient space for the ascending of the gas-liquid mixed fluid.

Furthermore, an inner diameter of any auxiliary hole 122 ranges from 1/10 to ⅛ of the inner diameter of the shell, which provides sufficient space for the descending of the liquid fluid, and is beneficial for improving the gas-liquid mixing effect.

A radial distance between the center of each auxiliary hole 122 and the center of the central hole 121 ranges from 0.6 to 0.8 times of the inner diameter of the shell, so that the liquid can achieve the best vortex motion state and best gas-liquid mixing effect. In the specific embodiment, preferably, the radial distance between the center of any auxiliary hole 122 and the center of the central hole 121 is specifically 0.7 times of the inner diameter of the shell.

The multi-region slurry shell-and-tube reactor provided according to the present disclosure is described in detail above. In this specification, examples are used to explain the principle and embodiments of the present application. The above description of the embodiments is only used to help understand the method and the core idea of the present application. Those skilled in the art may make variations to the embodiments and the application scope based on the idea of the present application. In conclusion, the contents of the specification should not be understood as limitation to the present application.

The invention claimed is:

1. A multi-region slurry shell-and-tube reactor, comprising a shell, wherein at least two reaction regions are provided inside the shell, a transverse partition plate is provided between the any two adjacent reaction regions, which is configured to separate any two adjacent reaction regions and pass through tube rows, a central hole is provided at the center of each transverse partition plate, an auxiliary hole distributed around a central axis of the central hole is provided in each transverse partition plate to generate a vortex state in the at least two reaction regions cooperating with the central hole, the gas-liquid mixed reactant in the at least two reaction regions ascends through the central hole due to low density while the gaseous reactant descends through the auxiliary hole due to high density, so as to form a rising and falling circulation phenomenon in the at least two reaction regions, and block the liquid reactant from circulating along an inner chamber of the shell,
wherein an inner diameter of the central hole ranges from ⅕ to ⅓ of an inner diameter of the shell,
wherein an inner diameter of any auxiliary hole ranges from 1/10 to ⅛ of the inner diameter of the shell,
wherein a first reaction region is provided at the bottom of the at least two reaction regions, the at least two reaction regions comprises the first reaction region located at a bottom end of the shell, a gaseous reactant inlet and a liquid reactant inlet are provided on a side of the first reaction region, and the liquid reactant inlet is located above ½ of a height of the first reaction region.

2. The multi-region slurry shell-and-tube reactor according to claim 1, wherein a radial distance between the center of any auxiliary hole and the center of the central hole ranges from 0.6 to 0.8 times of the inner diameter of the shell.

3. The multi-region slurry shell-and-tube reactor according to claim 1, wherein the number of auxiliary holes provided in any transverse partition plate ranges from 3 to 6.

4. The multi-region slurry shell-and-tube reactor according to claim 3, wherein three to six auxiliary holes uniformly arranged in a ring shape are provided in each transverse partition plate.

5. The multi-region plasma shell-and-tube reactor according to claim 4, wherein an axial distance between any two adjacent transverse partition plates ranges from 0.5 to 1 times of the inner diameter of the shell.

6. The multi-region slurry shell-and-tube reactor according to claim 4, wherein in a case that a height of the shell is lower than 5 meters, two to four transverse partition plates are provided inside the shell; and in a case that the height of the shell is greater than 5 meters, at least four transverse partition plates are provided inside the shell.

7. The multi-region slurry shell-and-tube reactor according to claim 1, wherein the number of auxiliary holes provided in any transverse partition plate ranges from 3 to 6.

8. The multi-region slurry shell-and-tube reactor according to claim 1, wherein the number of auxiliary holes provided in any transverse partition plate ranges from 3 to 6.

9. The multi-region slurry shell-and-tube reactor according to claim 2, wherein the number of auxiliary holes provided in any transverse partition plate ranges from 3 to 6.

* * * * *